March 27, 1945.          J. D. FENNER          2,372,626
INTERNAL CUTTING DEVICE
Filed April 23, 1943
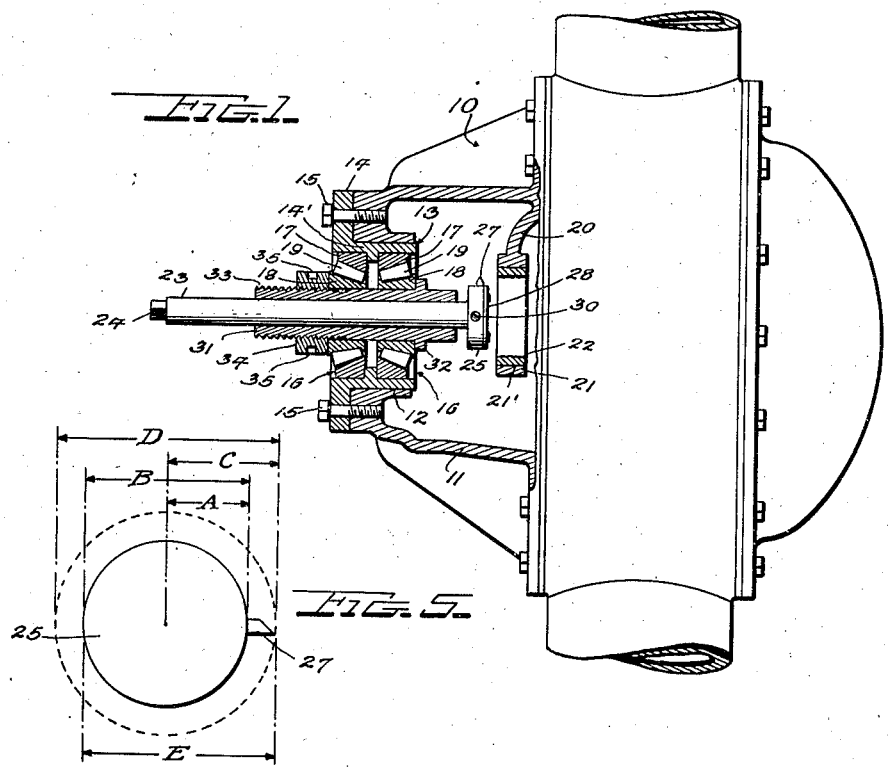
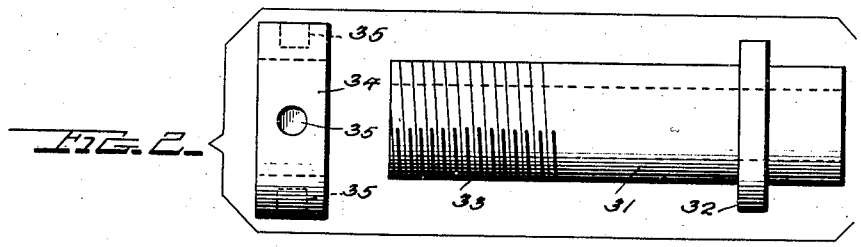
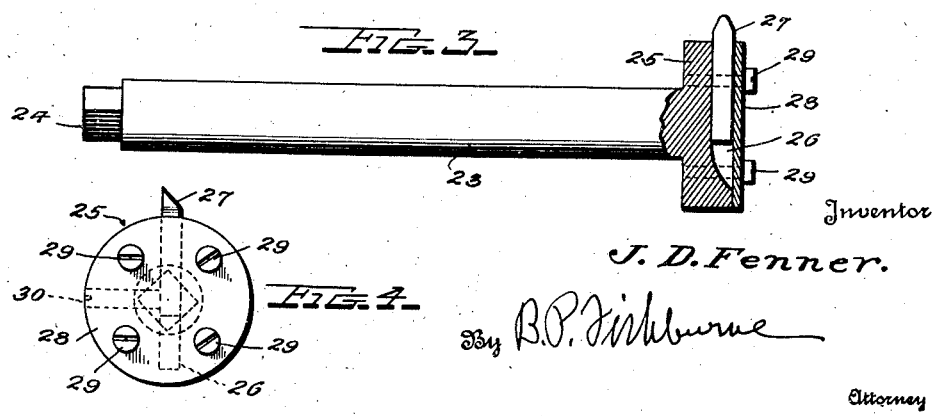
Inventor
J. D. Fenner.
By B. P. Fishburne
Attorney Patented Mar. 27, 1945

2,372,626

UNITED STATES PATENT OFFICE 2,372,626

INTERNAL CUTTING DEVICE

Jack D. Fenner, South Bend, Ind.

Application April 23, 1943, Serial No. 484,273

5 Claims. (Cl. 77—2)

My invention relates to an internal cutting device.

The ordinary heavy duty differential gearing used upon trucks or other vehicles, embodies a housing having an outer cage within which is mounted an outer pair of roller bearings, and an inner cage, receiving an inner third roller bearing. The outer pair of roller bearings holds the intermediate portion of the stub shaft, while the inner roller bearing holds the inner end of the stub shaft. Ball bearings are also used instead of roller bearings. When the bore of the inner cage wears or becomes oversize, this housing is ordinarily discarded or junked, due to the inaccessibility of the bore of the inner cage and also due to the large size of the housing which renders its manipulation difficult.

An important object of the invention is to provide a cutting device which will render it possible to restore the bore of the inner cage to a proper or original diameter, cheaply and quickly.

A further object of the invention is to provide a device of the above mentioned character which may be mounted upon the housing, and operated to do the work, without the aid of other machinery.

A further object of the invention is to provide a device of the above mentioned character which is adapted to be mounted upon the outer bearings and to be centered by the outer bearings with respect to the bore to be cut.

A further object of the invention is to provide means to draw the inner rings of the outer bearings together, taking up any play in the bearings, and causing the inner rings to accurately center the cutting device.

A further object of the invention is to provide a device of the above mentioned character, which is simple in construction and may be quickly applied to the outer roller bearings.

A further object of the invention is to provide a device of the above mentioned character which may be manually operated, where power is not available.

A further object of the invention is to provide means for accurately adjusting the cutter, to form the bore of the proper diameter.

Other objects and advantages of the invention will be apparent during the course of the following description.

In the accompanying drawing forming a part of this application and in which like numerals are employed to designate like parts throughout the same, Figure 1 is a plan view of a differential gear housing and a device embodying my invention applied to the housing, parts in central horizontal section, Figure 2 is an exploded plan view of the guide sleeve and nut, Figure 3 is a plan view of the cutting tool, parts in central vertical section, Figure 4 is an end elevation of the same, and Figure 5 is a diagrammatic view illustrating the adjustment of the cutter.

In the drawing, wherein for the purpose of illustration is shown a preferred embodiment of my invention, the numeral 10 designates a housing of a heavy duty differential gearing, ordinarily applied to truck or the like. This housing has a forward tubular extension 11, providing a forward cylindrical opening 12, receiving a tubular cage 13, having a flange 14 and an inner web 14'. The flange 14 is removably secured to the tubular extension 11 by bolts 15. The cage 13 holds a pair of roller bearings 16, which are radial and end thrust bearings. Each bearing 16 includes an outer ring or race 17 and an inner ring or race 18, and tapered rollers 19, held between the rings or races. Each set of rollers 19 decreases in diameter inwardly toward the other set of rollers 19. It is thus seen that when the inner rings or races 18 are shifted longitudinally toward each other, while the outer rings or races 17 are held against inward movement by the web 14', that any play in the bearings will be taken up and that the inner rings 18 will be accurately centered with respect to the cage 13. Ball bearings embodying inner and outer rings and balls between the rings may be used instead of the roller bearings, and the inner rings may be drawn together and the play taken up. The housing 10 further comprises an inner web 20, having a cage 21, provided with a bore 21', to receive the inner roller bearing, or ball bearing, (not shown). The stub shaft (not shown) of a differential gearing has its intermediate portion arranged within and held by the inner rings 18, while its inner end is arranged within and held by the inner ring of the inner roller bearing (not shown) of the cage 21. This is the conventional construction of the differential gearing used upon trucks or the like.

When the bore 21' of the cage 21 becomes oversize due to wear or the like, it must be restored to the original smaller diameter or the housing discarded.

The numeral 22 designates an added layer of metal which has been brazed to the wall of the oversize bore 21' of the cage 21. This added metal must have a bore of accurate diameter, cut or machined therein.

My cutting device comprises a cutting tool, which comprises a cylindrical shank 23, provided at one end with an extension 24, polygonal in cross section, to be engaged by a wrench or other tool whereby the shank may be manually manipulated. Preferably formed integral with the opposite end of the shank 23 is a cylindrical head 25, having a radial groove 26, to receive a cutter 27. The outer side of this groove is covered by a disk 28, secured to the head by screws 29 or the like. The head is provided with a radial set screw 30, which clamps the cutter 27 in the selected adjusted position.

The shank 23 is mounted within a guide sleeve 31, and has a sliding fit therein, to turn and move longitudinally with relation to the guide sleeve. This guide sleeve is adapted for insertion within the inner rings 18 of the bearings 16 and preferably has a sliding fit therein. Near its inner end, the guide sleeve 31 has a stop shoulder or flange 32, preferably formed integral therewith and this stop shoulder or flange is arranged to engage the inner end of the inner ring 18. The sleeve 31 has its outer end screw threaded, as shown at 33, to receive a nut 34, having recesses 35 in its periphery, for receiving a spanner wrench.

When the bore 21' of the cage 21 is oversize and it is desired to restore the bore 21' to the original or smaller diameter, the pinions or gears and the stub shaft are removed from the housing 10. The cage 13 is also removed whereby access may be had to the interior of the housing so that the added metal 22 may be brazed to the inner wall of the cage 21. While the cage 13 is removed, the guide sleeve 31 has its left end, Figure 1, inserted into the inner rings 12, and the nut 34 is then applied to the screw threaded end of the guide sleeve 31 and screwed up. This nut is screwed up sufficiently tight so that all play is taken up between the rings 17 and 18 and the rollers 19 in each bearing. Since the rollers 19 in one bearing taper toward the rollers 19 of the other bearing, it is obvious that when the inner rings 18 are moved inwardly toward each other, while the outer rings 17 are held against such inward movement, all play between the rings and rollers will be taken up and the inner rings 18 will be accurately centered with respect to the cage 13 and with respect to the bore to be cut in the added metal 22. The same action occurs when ball bearings are used instead of roller bearings. The left end of the shank 23 is now inserted into the left end of the guide sleeve 31 and such left end will project outwardly beyond the guide sleeve. The cutter 27 may be radially adjusted before or after the shank is inserted into the guide sleeve. With the parts thus assembled and adjusted, the cage 13 is inserted into the opening 12 of the tubular extension 11 and rigidly held therein by manipulation of the bolts 15, which clamp the flange 14 to the extension 11. It is thus seen that the guide sleeve 31 and roller bearings will now serve as a guide for the shank 23 and will accurately center the same with relation to the bore to be cut or machined in the added metal 22. A wrench or the like may now be applied to the extension 24 and the shank 23 may be moved longitudinally to bring the cutter 27 into engagement with the added metal 22. The wrench may be employed to turn the shank 23 whereby the cutter 27 will cut the bore in the added metal, to the precise diameter. After the cutting operation, the guide sleeve 31 and shank 23 are separated from the bearings 16 by the reverse of the operations already described.

In Figure 5, I have shown a method of predetermining the bore diameter to be cut in the added metal 22, by setting the cutter 27 to a dimension E. This dimension E can be set up by using a micrometer. After the bore has been cut in the added metal 22 it will be of the correct size and have a diameter indicated by D. B is the diameter of the head 25, A the radius of the head, and C the radius of the cutter 27.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention, what is claimed is:

1. A device for use in connection with a differential gear housing having an outer opening and a cage axially inwardly of the outer opening, said device comprising an outer cage removably mounted within the outer opening, a pair of bearings mounted within the removable cage, each bearing including inner and outer rings and rolling elements between the rings, a guide sleeve having a stop element and adapted for insertion within the inner rings, a nut having screw-threaded engagement with the guide sleeve, the nut and stop element drawing the inner rings together and thereby centering the guide sleeve with respect to the outer opening, a shank mounted within the guide sleeve to move longitudinally and turn with relation thereto, and a cutting device mounted upon the inner end of the shank and having a diameter less than that of the outer opening, the outer end of the shank extending outwardly beyond the guide sleeve, the arrangement being such that the outer cage, bearings, guide sleeve, shank and cutting device constitute a unit to be applied to the housing, the cutting device being inserted through the outer opening when the outer cage is introduced into the outer opening, and the outer end of the stem being engaged for shifting the stem longitudinally and turning the same to cause the cutting device to act upon the inner cage.

2. A device for use in connection with a differential gear housing having an outer opening and a cage axially inwardly of the outer opening, said device comprising an outer cage to be removably mounted within the outer opening, a guide sleeve arranged within the cage, adjustable means to secure the guide sleeve to the cage and center the guide sleeve with respect to the cage, a shank mounted within the guide sleeve to move longitudinally and turn with relation to the guide sleeve and having its inner and outer ends extending beyond the guide sleeve, and a cutting device mounted upon the inner end of the shank and having a diameter less than that of the outer opening, the outer cage, guide sleeve, adjustable means, shank and cutting device constituting an assembled unit to be arranged exteriorly of the housing and applied to the housing by passing the cutting device inwardly through the outer opening and inserting the outer cage in said outer opening, the outer end of the shank being engaged to move the shank longitudinally and turn the same to cause the cutting device to act upon the inner cage.

3. The combination with a differential gear housing having an outer opening and an inner cage disposed axially inwardly of the outer opening and in alignment therewith, of an outer cage, a pair of bearings mounted within the outer cage, each bearing including inner and outer rings and rolling elements between the rings, a guide sleeve for insertion within the inner rings and having a stop element to engage one inner ring, a nut having screw-threaded engagement with the sleeve to engage the other inner ring and draw the inner rings together to center the sleeve with respect to the outer cage, a shank slidably mounted within the guide sleeve to move longitudinally and turn with relation thereto and extending beyond the inner and outer ends of the guide sleeve, a head secured to the inner end of the shank, a radial cutter mounted upon the head, the head and cutter having a smaller diameter than the outer opening, the outer cage, bearings, guide sleeve, shank, and cutter constituting an assembled unit to be arranged exteriorly of the housing and to be applied thereto by passing the head and cutter inwardly through the outer opening and inserting the outer cage into the outer opening, the outer end of the shank being engaged to shift the shank longitudinally and to turn the same to cause the cutter to act upon the inner cage, and means to retain the outer cage within the outer opening.

4. A device for use in connection with a differential gear housing having an outer opening, an inner cage arranged axially inwardly of the outer opening, an outer cage removably mounted within the outer opening, a pair of bearings mounted within the removable cage, each bearing including inner and outer rings and rolling elements between the rings, said device comprising a guide sleeve having a stop element and adapted for insertion within the inner rings, a nut having screw threaded engagement with the guide sleeve, the nut and stop element drawing the inner rings together and thereby centering the guide sleeve with respect to the outer rings, a shank mounted within the guide sleeve to move longitudinally and turn with relation thereto, and a cutting device mounted upon the inner end of the shank and having a diameter less than that of the outer opening, the outer end of the shank extending outwardly beyond the guide sleeve, the arrangement being such that the outer cage, bearings, guide sleeve, shank and cutting device constitute a unit to be applied to the housing, the cutting device being inserted through the outer opening when the outer cage is introduced into the outer opening, and the outer end of the stem being engaged for shifting the stem longitudinally and turning the same to cause the cutting device to act upon the inner cage.

5. A device for use in connection with a differential gear housing having an outer opening and inner cage arranged axially inwardly of the outer opening, an outer cage removably mounted within the outer opening, a pair of bearings mounted within the removable cage, each bearing including inner and outer rings and rolling elements between the rings, said device comprising a guide sleeve provided near its forward end with a stop element to engage one inner ring, the guide sleeve being inserted within the inner rings by moving the same rearwardly through the inner rings and the stop element being arranged within the gear housing when the device is in use, a nut having screw threaded engagement with the rear end of the sleeve and arranged exteriorly of the gear housing and outer cage, said nut engaging the outer inner ring and drawing the inner rings together to center the sleeve with respect to the outer cage, a shank slidably mounted within the guide sleeve to move longitudinally and turn with relation thereto and extending beyond the inner and outer ends of the guide sleeve, a head secured to the inner end of the shank, a radial cutter mounted upon the head, the head and radial cutter having a smaller diameter than the outer opening, the outer cage, bearings, guide sleeve, shank, and cutter constituting an assembled unit to be arranged exteriorly of the housing and to be applied thereto by passing the head and cutter forwardly through the outer opening and inserting the outer cage into the outer opening, the outer end of the shank being engaged to shift the shank longitudinally and to turn the same to cause the cutter to act upon the inner cage, and means to retain the outer cage within the outer opening.

JACK D. FENNER.